United States Patent

[11] 3,627,616

| [72] | Inventor | Douglas Steward Davis<br>Parkersburg, W. Va. |
|---|---|---|
| [21] | Appl. No. | 867,534 |
| [22] | Filed | Oct. 20, 1969 |
| [45] | Patented | Dec. 14, 1971 |
| [73] | Assignee | E. I. du Pont de Nemours and Company<br>Wilmington, Del. |

[54] APPARATUS AND METHOD FOR AUTOMATICALLY TRIMMING AND JOINING LENGTHS OF UNIFORM THICKNESS PLASTIC SHEETING AND WEBS TO FORM A JOINED SHEET OF UNIFORM THICKNESS
11 Claims, 11 Drawing Figs.

[52] U.S. Cl................................................. 156/502, 156/507
[51] Int. Cl...................................................... B31f 5/00, B65n 19/18, G03d 15/04
[50] Field of Search............................................ 156/502, 505, 507, 509

[56] References Cited
UNITED STATES PATENTS

| 3,227,594 | 1/1966 | Ryan | 156/507 X |
|---|---|---|---|
| 3,384,527 | 5/1968 | Fener | 156/502 |

*Primary Examiner*—Benjamin A. Borchelt
*Assistant Examiner*—J. J. Devitt
*Attorney*—Harry E. Braddock ABSTRACT: An apparatus and method having an automatically initiated and programmed sequence of operations especially well adapted for severing a first length of relatively thick and easily deformable sheeting of thermoplastic material being fed to a sheeting processing unit, and joining to its severed outgoing end portion the incoming end portion of a second length of similar sheeting in a butt-welded seam of uniform thickness equal to the thickness of the sheeting being joined, the apparatus comprising basically three cooperating interrelated moving units for gripping, conveying, cutting, and bonding lengths of sheeting in rapidly accomplishing its primary function with a minimum number of mechanical movements and operations.

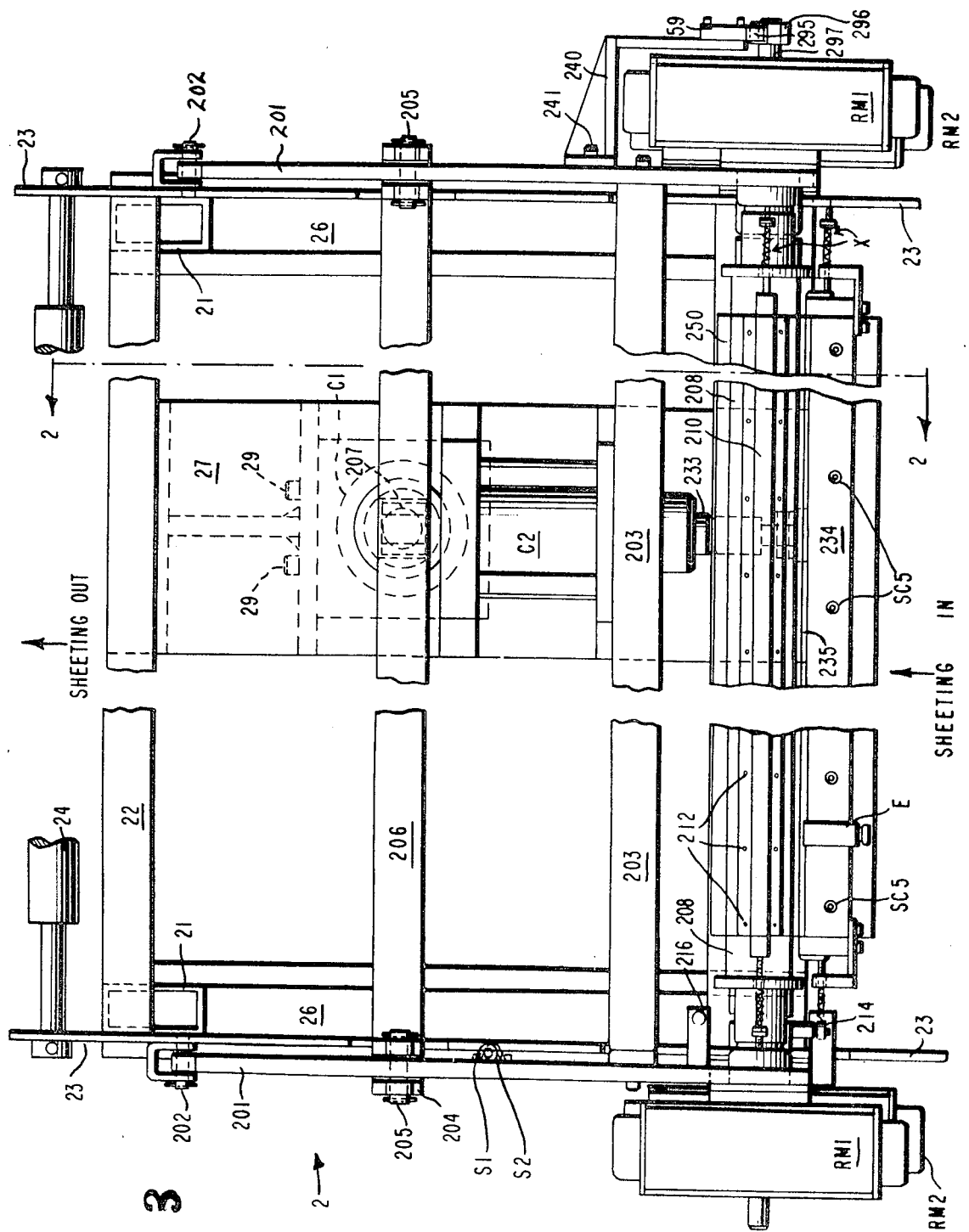

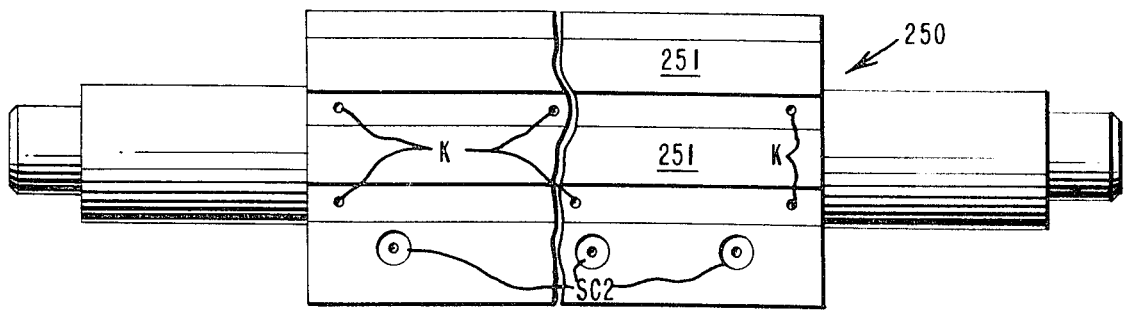
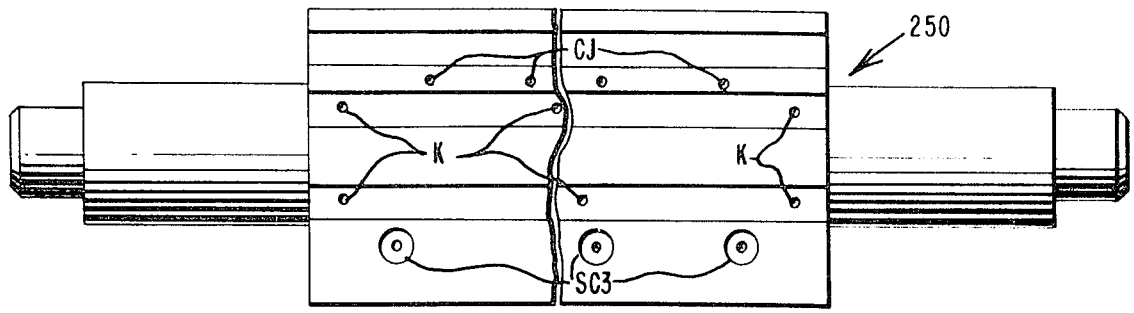
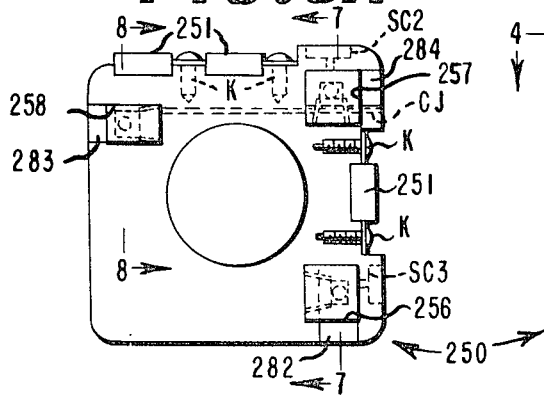
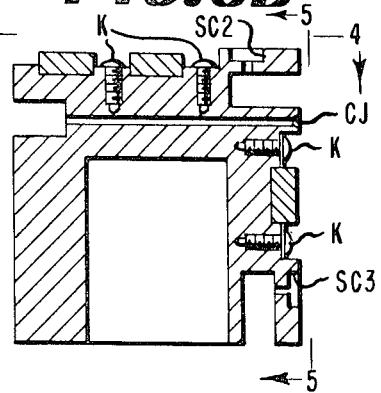
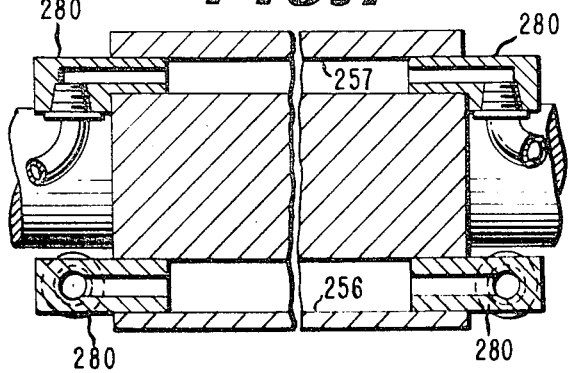
INVENTOR
DOUGLAS STEWARD DAVIS
BY *Harry E. Braddock*
ATTORNEY

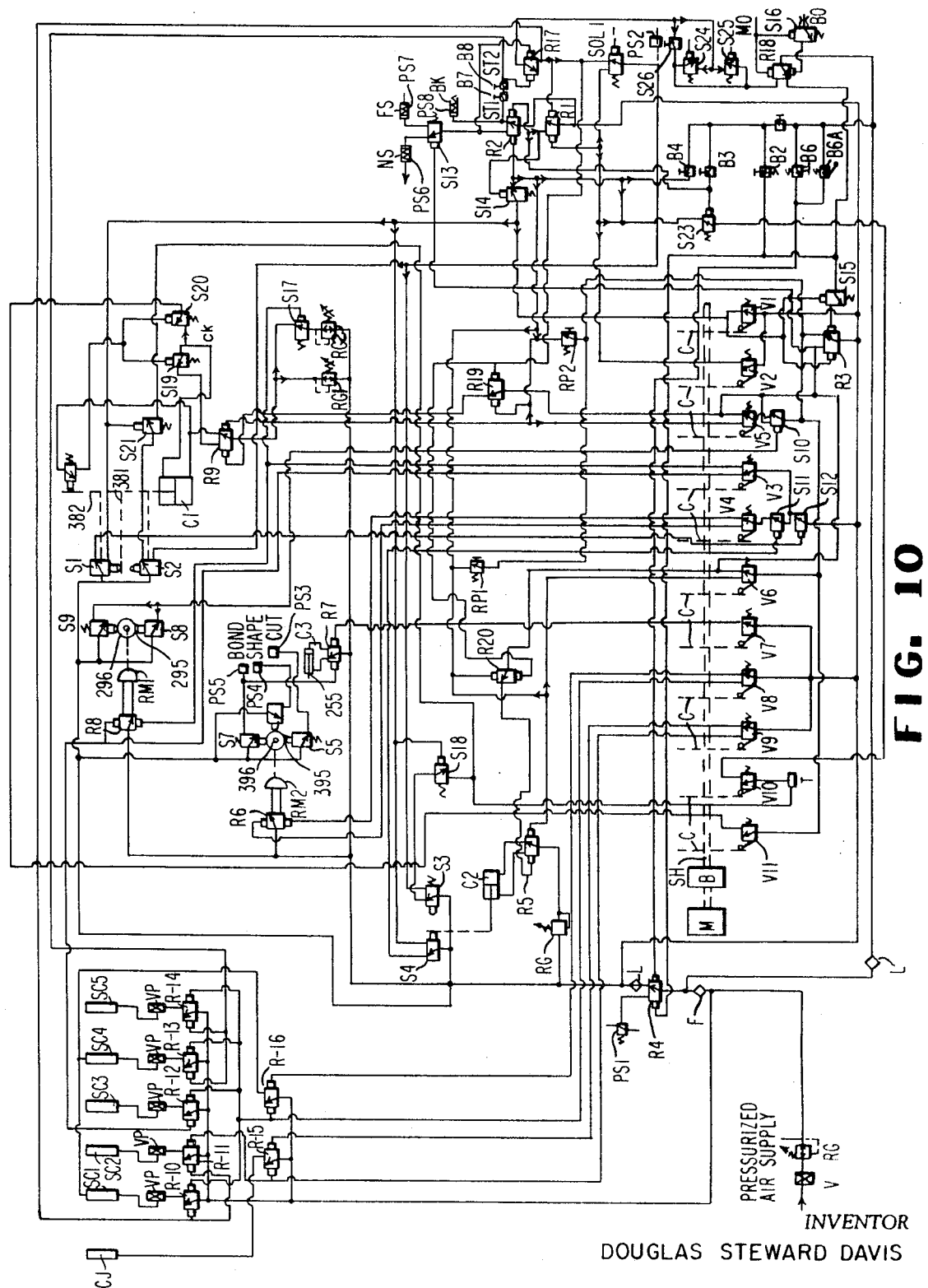

APPARATUS AND METHOD FOR AUTOMATICALLY TRIMMING AND JOINING LENGTHS OF UNIFORM THICKNESS PLASTIC SHEETING AND WEBS TO FORM A JOINED SHEET OF UNIFORM THICKNESS

FIELD OF THE INVENTION

This invention relates generally to the field of handling a series of lengths of sheeting, or webs, of thermoplastic material and trimming and bonding them together to form a continuous length of sheeting with uniform bonded portions equal in thickness to the thickness of the lengths of sheeting. More specifically the invention involves particular improved apparatus and process combinations for automatically severing a length of sheeting being unwound from a first roll and butt-welding the outgoing end portion thereof to the incoming end of a length of sheeting on a second roll with no significant change in thickness across the butt-welded joint, with provisions made for automatically stopping the unwinding operation prior to the severing and bonding steps and automatically starting the unwinding operation when the severing and bonding steps are completed.

It is an object of the invention to provide such an improved apparatus and process combinations, or arrangements, which perform the specified function in a manner which operates relatively rapidly, reduces waste due to trimmed scrap and in a manner which requires a minimum number of mechanical movements and operations with a minimum amount of manual handling of the sheeting.

It is another object of the invention to provide such apparatus arrangements which are especially well adapted to handle relatively thick and easily deformable webs or sheeting and which are effective, safe and reliable in operation yet simple in construction and economical to fabricate, operate, and maintain.

Other objects and advantages will appear from a consideration of the following specification, claims, and accompanying drawings.

PRIOR ART BACKGROUND OF THE INVENTION

The art of handling lengths of sheeting of thermoplastic and other materials and trimming and bonding them together to form a continuous length of sheeting is very active and crowded. U.S. Pat. Nos. 2,035,682 and 3,138,341 are believed to be illustrative examples of such prior art. However in handling and processing certain relatively thick easily deformable types of sheeting, such as the product sold for use as the inner layer of automobile safety glass laminates, certain special problems have occurred. For example, when a series of lengths of such sheeting were joined by a form of lap joint or weld to provide a continuous length of sheeting for treatment at a processing station having fixed clearances relative to the sheeting thickness such as opposed rolls engaging opposite major surfaces of the sheeting, the presence of a lapped joint in easily deformable material required costly wasteful procedures such as temporarily separating the rolls to permit passage of the lapped or double thickness joint. This in turn meant, where the rolls took part in the processing or treatment of the sheeting, that a certain length on each side of the rolls was not treated or processed. In high speed operations this meant significant waste and an additional manipulation of the processing equipment. In addition, easily deformable sheeting presents problems with respect to tearing and breakage at undesired points when knife cutting action is attempted, especially "on the fly" cutting operations while the sheeting is still moving.

Moreover, poorly or incompletely formed lap joints sometimes act as conveyor pockets collecting and carrying along foreign materials in liquid or particulate form which cause problems in treating and handling sheeting having such lap joints.

As a further element of the prior art, most similar general arrangements for cutting and bonding two lengths of sheeting together require a considerable amount of manual handling of the sheeting and apparatus elements. This involves undesirable expenditure of time and cost.

The new and improved apparatus and process combinations embodying principles of this invention and which provide the uniform thickness continuous sheet have not only solved the problems first described above to permit continuous operation with greatly reduced waste, but also provide additional improved features relating to effective, simple automated operation which are believed to be of value and significance to sheet handling and bonding operations beyond those dealing only with the special relatively thick easily deformable sheeting.

SUMMARY OF THE INVENTION

Generally stated, the objects of the invention and a novel contribution to the art are achieved in the provision of particular apparatus and process combinations which act rapidly on stationary lengths of sheeting in an automatically programmed specified sequence of operations and utilize heat cutting, bonding means, and bonded seam-shaping means to join lengths of sheeting with uniform butt-welded seams of a thickness equal to that of the sheeting.

Other features and aspects of the invention will appear hereinafter.

DESCRIPTION OF THE DRAWINGS

FIG. 3 is partial plan view of the apparatus unit shown in FIG. 2 with certain parts broken away.

FIG. 4 is a partial plan view of an elongated transfer unit embodying features of the invention and showing the details of one of its elongated working portions.

FIG. 5 is a partial side elevational view of the unit of FIG. 4 showing the details of the other elongated working portion of the unit.

FIG. 6A is an end view of the assembled unit of FIG. 4.

FIG. 6B is a transverse cross-sectional view of the main casting member of the unit of FIGS. 4, 5, and 6A.

FIG. 7 is a partial longitudinal cross-sectional view of the unit shown in FIG. 6A taken at line 7—7.

FIG. 8 is a partial longitudinal cross-sectional view of the unit shown in FIG. 6A taken at line 8—8.

FIG. 10 is a partial schematic and diagrammatic showing of the fluid pressure control and operating systems and cooperating machine components of a preferred apparatus embodying principles of the invention, connections to the electrical portions of the apparatus also being shown.

Figure 1:
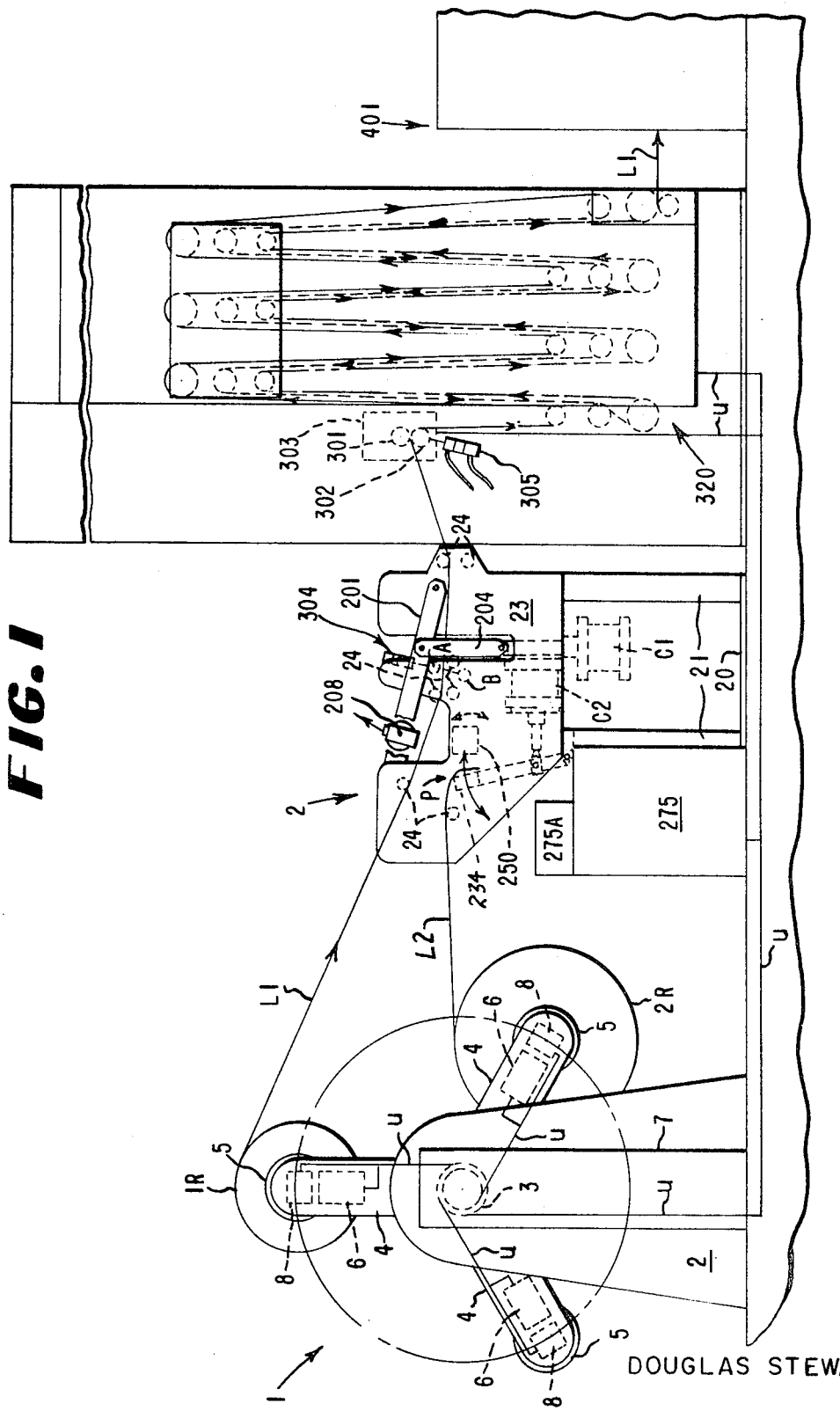
FIG. 1 is a partial overall side elevational view of an apparatus combination embodying principles of the invention showing a sequential roll sheeting unwind unit, a unit for cutting and bonding the outgoing end of one roll of sheeting to an incoming end of another roll, and a sheeting processing unit.

An overall view of an apparatus combination embodying features of the invention is shown in FIG. 1. This combination comprises a unit 1 for receiving and supporting a plurality of rolls of sheeting 1R, 2R for sequential unwinding thereof. This type of unwinding unit is known in the art and as shown comprises two opposed side members 2 supporting a transverse shaft 3 on which are carried a plurality of pairs of radial arms 4. Each pair of arms 4 carries rotary chuck devices 5 for engaging and rotatably supporting rolls of sheeting 1R, 2R. Each pair of arms is provided with a brake device 6 for controlling rotation of the chuck devices and rolls of sheeting carried thereby. Unit 1 is also provided with a powered drive unit 7 for rotating the arms 4 to bring rolls of sheeting sequentially into operative unwinding position. Suitably conventional means 8 such as footage counters or roll radius sensors, are provided to determine when the sheeting on a given roll has been substantially unwound.

The overall combination further comprises a unit 2 for receiving and guiding a first length of sheeting L1 being unwound from a first roll on unit 1 and also for receiving and holding in a given position P a portion of a length of sheeting L2 from a second roll supported on unit 1. Unit 2 functions, automatically under the control of control unit 275, before the length of sheeting L on the first roll becomes completely unwound, to sever length L1 and join its severed end which is being guided through the unit, to the portion of length of sheeting L2 from the second roll. The unwinding operation is stopped during the sheeting severing and joining operations. This will be described in detail as will operation of unit 2, at a later point in this specification. The overall apparatus combination further comprises a powered unit 303 comprising driven feed rolls 301 and 302 for moving lengths of sheeting through unit 2 and providing the tension for unwinding the rolls at unit 1. Unit 303 also comprises a suitable means 305 for positively braking sheeting engaged therewith in order to stop movement of sheeting being unwound. Unit 304 operates when unwinding stops to provide a predetermined amount of slack in sheeting L1. The unit indicated by reference numeral 401 represents a sheeting treatment or processing means to which the joined lengths of sheeting are supplied. Unit 401 is usually continuously operating and since unit 2 requires stopping of the unwinding operation during its severing and joining operations, a conventional suitable sheeting accumulator unit 320 is provided for the sheeting between the unit 2 and the unit 320. Unit 401 comprises opposed separable roll assemblies engaging the sheeting to festoon the sheeting as shown to build up automatically a reserve supply of sheeting being supplied to unit 401 such that when the unwinding is stopped during operation of unit 2, operation of unit 401 continues uninterrupted, using the supply of sheeting stored in accumulator 320 which is sufficient to supply unit 401 during the period required for operation of unit 2. The means 8 for determining when the sheeting on a given roll has been substantially unwound, drive unit 7, brake devices 6, control unit 275, powered unit 303 which comprises the drive rolls and braking means for the sheeting, and the accumulator unit 320 are operatively connected in a suitable fashion such as conduits U to form a control system to automatically stop unwinding sheeting and movement of the same through unit 2 to the accumulator unit 320, initiate feed of sheeting from the reserve supply in the accumulator unit 320 to the processing unit 401, initiate operation of unit 2 and after completion of the operation of unit 2 resuming unwinding operation including restoring a reserve supply of sheeting in the accumulator unit.

Figure 2:
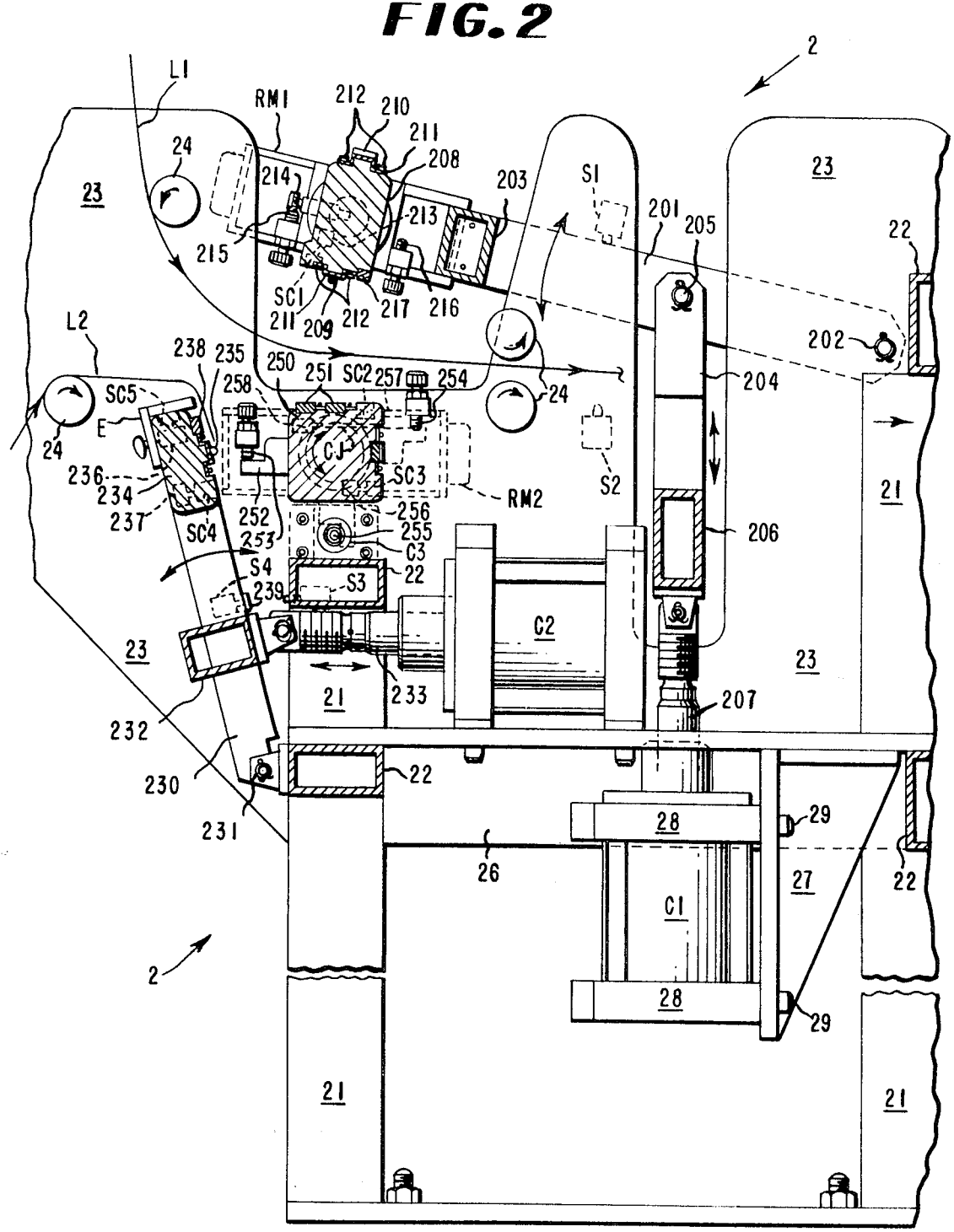
FIG. 2 is a partial vertical longitudinal cross-sectional view of an apparatus unit embodying features of the invention for cutting and bonding one length of sheeting to another length of sheeting, certain parts shown broken away. This view is taken along line 2—2 shown in FIG. 3.

The construction of unit 2 is shown enlarged and in greater detail in FIGS. 2 and 3. Unit 2 comprises a supporting frame structure which comprises a base member 20 to which are secured by suitable means a number of vertically extending members 21.

Vertical members 21 are interconnected by horizontal members 22 and 26 to form a frame structure of suitable rigidity and strength. The frame structure is provided with two opposed spaced sideplate members 23 which support a plurality of freely rotatable roller members 24 which define a general path for engaging, supporting, and guiding lengths of sheeting located in the unit 2. As viewed in FIG. 1 the roller members 24 at the left side of unit 2 generally establish an inlet portion and the roller members on the right side generally establish an outlet portion for sheeting being handled. As shown in FIGS. 1, 2, and 3 the supporting frame structure of unit 2 carries a first pivotably mounted assembly comprising two spaced parallel arm elements 201 mounted near the ends thereof on shafts or pivot pins 202 carried in sideplate members 23. Arm elements 201 are connected intermediate their ends by a crossbeam element 203. Arm elements 201 adjacent their other ends carry a rotatable first elongated unit 208 extending transversely of unit 2 and of the general path of movement of sheeting through the unit. The ends of the unit 208 are rotatably supported in arm elements 201 as best shown in FIGS. 2 and 3. Each arm element 201 also carries a conventional pneumatic rotary drive motor RM1 (best shown in FIG. 3) which is operatively connected to rotate unit 208 about its longitudinal axis between two positions spaced about 180° apart. Unit 208 is provided with a radially, or transversely extending element 214 adjacent one of its ends which element cooperates with two fixed stop elements 215 and 216 to limit the rotary movement of the unit 208 and establish the two positions between which the unit is rotated. As seen in FIG. 3 and indicated schematically in FIG. 10 one end of elongated unit 208 is provided with an extension shaft 297 which carries a circular plate element 296 having a radial projection 295 which cooperates with two devices S9 and S8 which sense the presence of unit 208 in each of its two rotary positions. Elongated unit 208 is provided with electrically heated wire element 209 extending along one of its elongated surfaces for cutting sheeting and is further provided with an electrically heated bonded seam shaping platen element 210 extending along another of its elongated surfaces which is diametrically opposed to said one elongated surface. Suitable devices comprising a spring-biased movable screw element attached to the heated element as indicated at X in FIG. 3 are provided to accommodate thermal expansion of electrically heated elements without distortion. A strip 211 of an adhesive coated tape formed of a fluorinated plastic material is positioned between the electrically heated elements and the main body unit 208 as shown and is additionally held in position by screws 212. The elongated surface of unit 208 on which the electrically heated wire element is carried is also provided with an elongated bar 217 of a suitable resilient cushioning material such as a silicon rubber adhesively secured thereto, and is further provided with a plurality of spaced recesses SC1 each connected to a passageway 213 extending longitudinally through unit 208 and operatively connected to a gas pressure system not shown for selectively applying to the passageway and the recesses either a subatmospheric pressure to provide a vacuum clamping action on sheeting engaged with the recesses and deformed thereby to give frictional snubbing action around the edges of the recesses or a pressure significantly above atmospheric to provide streams or jets for cooling purposes to be described later.

The first pivoted assembly comprising rotatable unit 208 and arm elements 201 is moved between a first upper position as seen in FIG. 2 and a second position as shown in FIG. 9B by a conventional reciprocating pneumatic drive motor C1 which is operatively connected to the arm elements 201 by means of U-shaped link member comprising upwardly projecting side arm members 204 connected at their lower ends by crossmember 206, members 204 connected to arm elements 201 by pin elements 205 and crossmember 206 connected to the drive shaft 207 of drive motor C1 by a similar pin element connection. Two units S1 and S2 are provided on the supporting frame structure to detect the presence of this pivoted assembly in each of its two positions.

The supporting frame structure of unit 2 also carries another, or second, pivotally mounted assembly comprising two spaced parallel arm elements 230 pivotably mounted near the lower ends thereof on pins or shafts 230 carried by a bracket mounted on horizontal member 22 of the frame structure. Arm elements 230 are interconnected between their ends by a crossbeam element 232 and at their upper ends by another or second elongated unit 234 extending transversely of unit 2 and of the general path of movement of sheeting through the unit.

Second elongated unit 234 is provided with an electrically heated wire element 235 extending along one of its elongated surfaces for simultaneously trimming and bonding double thicknesses of sheeting. A strip of fluorinated plastic material is positioned between the wire element 235 and the one elongated surface and positively held by screws in the same manner as the strip 212 of the first elongated unit 208. The elongated surface of unit 234 on which the wire element 235 is carried is also provided with an elongated bar 238 of a suitable resilient cushioning material such as a silicon rubber adhesively secured thereto, and is further provided with a plurality of spaced recesses SC4 each connected to passageway 237 extending longitudinally through unit 234 and operatively connected in the same manner to the same gas pressure system as discussed above in connection with the recesses on the first elongated unit 208. Second elongated unit 234 is provided with another elongated surface adjacent the surface carrying the wire element 235, this another elongated surface provided with another plurality of spaced recesses SC5 each connected to a passageway 236 extending longitudinally through the unit and operatively connected to the same gas pressure system as discussed above in connection with the recesses on the first elongated unit 208. Device E, mounted on this surface is an edge guide for sheeting initially positioned on unit 234. The second pivoted assembly comprising second elongated unit 234 and arm elements 230 is moved between a first position as seen in FIG. 2 and a second position as shown in FIG. 9E by a conventional reciprocating pneumatic drive motor C2 which is operatively connected to crossbeam 232 by a pin interconnecting a bracket on the crossbeam and the drive shaft 233 of the motor. Motor C2, and motor C1 are suitably mounted on and connected to the supporting frame structure of unit 2 as shown in FIGS. 2 and 3. One of the arm elements supporting the second elongated unit 234 is provided with a projecting element 239 which cooperates with two units S3 and S4 carried by the supporting frame structure to detect the presence of the second pivoted assembly in each of its two positions.

The supporting frame structure of unit 2 also carries yet another, or third, elongated unit 250 the end portions of which are supported for rotation in side plate members 23 which also support at each end of the elongated unit 250 a conventional pneumatic rotary drive motor RM2 operatively connected to rotate elongated unit 250 between three positions spaced within about 270° rotation about the longitudinal axis of elongated unit 250. This unit 250 extends transversely of the general path of movement of sheeting through basic unit 2. Elongated unit 250 is provided with a radially or transversely extending element 252 which cooperates with two fixed stop elements 253 and 254 to limit the rotary movement of this elongated unit and establish two of the three positions between which the unit is rotated. The third position of elongated unit 250 is established by a movable stop element 255 which selectively moves into and out of the path of element 252 to limit rotary movement at a point between the other two positions when required. Movable stop element is actuated by a conventional pneumatic reciprocating motor C3 at the desired time by a part of the control system yet to be described. A circular plate element 396 having a radial projection 395, shown schematically in FIG. 10, is mounted on an extension shaft (not shown) carried by third elongated unit 250 and cooperates with three devices S5, S6, and S7 (FIG. 10) which sense the presence of elongated unit 250 in each of its three rotary positions.

Details of the construction of the third elongated unit 250 are shown in the enlarged views of FIGS. 4 through 8 as well as in FIG. 2. The third elongated unit 250 is provided with a first longitudinally extending surface portion having an elongated bar 251 of a suitable resilient cushioning material such as a silicon rubber adhesively secured thereto, and is further provided with a plurality of spaced recesses SC3 each connected to a passageway 256 extending longitudinally through elongated unit 250 and operatively connected in the same manner to the same gas pressure system as discussed above in connection with the recesses on the first elongated unit 208. This first surface of elongated unit 250 is further provided with a plurality of spaced recesses each connected with a passageway 258 extending through elongated unit 250 and operatively connected to the same gas pressure system previously discussed to provide jets of cooling gas when needed. Third elongated unit 250 is further provided with a second elongated surface portion having two elongated bars 251 of suitable resilient cushioning material such as a silicon rubber adhesively secured thereto. This second elongated surface portion of elongated unit 250 additionally is provided with a plurality of spaced recesses SC2 each connected to a passageway 258 extending longitudinally through elongated unit 250 and operatively connected to the same gas pressure system discussed previously. Portions of each of the elongated surfaces of elongated unit 250 are protected by tapes or strips of fluorinated plastic material which are both adhesively secured in position and positively secured by screws K. FIGS. 4–8 show additional details of construction of elongated unit 250 and indicate that the longitudinal passageways are formed by milling longitudinal slots in the basic unit, closing the outer portion of such slots with elongated covers or plugs 282, 283, 284 and inserting plugs 280 in the ends of the passageways to provide connections to conduits which connect the passageways to provide connections to conduits which connect the passageways to the gas pressure system. Similar construction arrangements are used for both the first elongated unit 208 and the second elongated unit 234.

Figure 9:
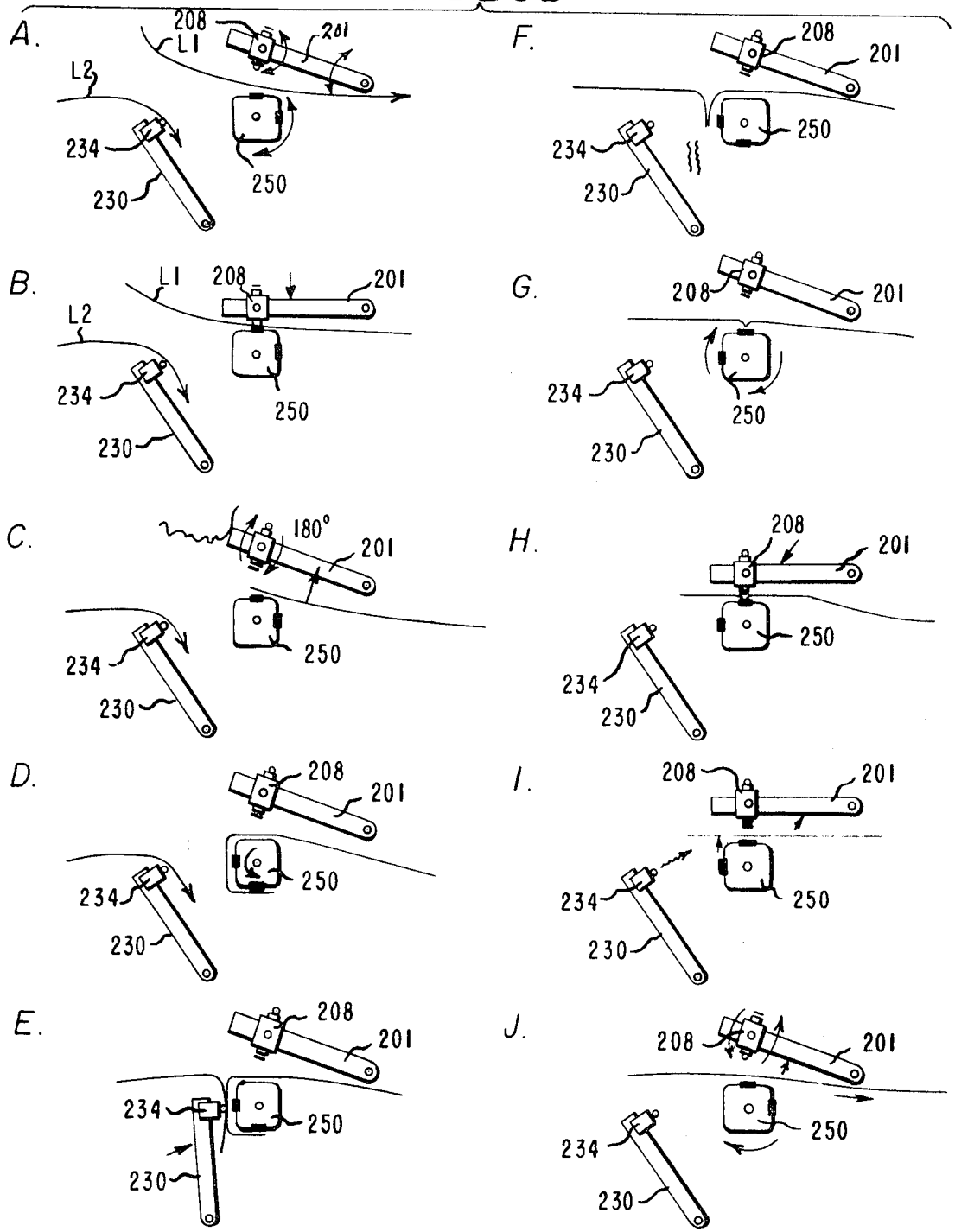
FIGS. 9A through J are schematic figures showing step by step the positions and operation of the three basic units of the apparatus unit for cutting and bonding two lengths of sheeting during the operating cycle.

The general operation of basic unit 2 is shown schematically in the simplified views of FIG. 9. These views illustrate the sequence of action and cooperation of the three main components of unit 2, namely; the first elongated unit 208, the second elongated unit 234, and the third elongated unit 250, in severing the first length of sheeting L1 (FIG. 9B), bringing a severed portion of length L1 into engagement with a second length of sheeting L2 (FIG. 9D and 9E), trimming and bonding the two lengths together in a single operation (FIG. 9E), shaping the bonded seam (FIG. 9H), and cooling the bonded seam (FIG. 9I).

The main pneumatic conduits system with its units, and controls for the apparatus combination disclosed are shown schematically in FIG. 10. Generally, in unit 2, the basic working components 208, 234, and 250 are moved by simple conventional commercial pneumatic motor units C1, C2, C3, RM1, and RM2 controlled by suitable conventional control valve units acting as pneumatic relays which are in turn operated by other valve units which are actuated by a number of cams C carried by a motor-driven shaft SH in the programmer device in the control unit 275 for basic unit 2 and by the various position sensing devices. This shaft SH, its drive motor M, brake B and Cams C are shown schematically in FIG. 10. The electrically heated elements are controlled by suitable conventional electrical controls housed in unit 275A and which are automatically actuated by the pneumatic control system.

The basically pneumatic system of FIG. 10 is provided with standard conventional units such as pressure regulators RG, filters F, and lubricators L. Valve units VI-VII are conventional commercial units and comprise spring-biased valves actuated between pneumatic flow controlling positions by mechanical engagement with cams C which are mounted on shaft SH which is rotated by motor M and braked by brake device B. The valve units identified by the letter R preceding a numeral are conventional commercial units and comprise a valve element shiftable between two pneumatic flow-controlling positions by two opposing pneumatic valve element shifting piston elements (self-venting) shown diagrammatically at each end of the unit representation V. These units act in some instances as pneumatic power relays. The valve elements of these units remain in a given position until pneumatically shifted to the other position.

The valve units identified by the letter S preceding a numeral are conventional commercial units and comprise a valve element shiftable in one direction to one flow-controlling position by a pneumatic valve element shifting piston or by mechanical engagement with a moving structure element shown diagrammatically at one end of the unit representation and returned in the other direction to the other flow controlling position by a spring element shown diagrammatically at the other end of the unit representation. Valve units RP1, RP2, B1, B2, B3, B4, S2B, B6, B6A, B7, and B8 are conventional commercial units and comprise a valve element shiftable in one direction to one flow controlling position by a manually actuated pushbutton shown diagrammatically at one end of the unit representation and returned in the other direction to the other flow controlling position by a spring shown diagrammatically at the other end of the unit representation.

Units PS1–PS8 are conventional commercial units comprising an electrical switch device which is actuated by pneumatic pressure.

Unit SOL1 is conventional commercial unit comprising a pneumatic flow controlling valve element actuated in one direction (left) by an electrical solenoid winding and returned in the other direction (right) by spring bias.

The Units indicated by the reference letters VP are conventional commercial venturi vacuum pump units actuated by pneumatic flow in a well-known manner and are shown schematically in operative association with the vacuum-clamping means which comprise the series of recesses SC1, SC2, SC3, SC4, and SC5.

Unit CK is a one way or check valve of a conventional commercial design.

The three way conduit intersections indicated by a dot and two arrows are diagrammatic representations of conventional commercial pneumatic units known as shuttle or double check valves having two input points and one output point for exclusive alternate feed from either one of the given input points, no crossflow being permitted between the input points, or connections. There units may be viewed as pneumatic "OR" devices which produce an output pressure in response to an input pressure at either of the input points, or connections.

The positions of the valve elements shown in FIG. 10 indicate the rest positions at the end of an operating cycle with the major component units of basic unit 2 in positions shown in FIG. 9J, with the pressurized air supply and electrical power units energized and the apparatus functioning to unwind a roll of sheeting and forward it to a sheeting processing unit.

In FIG. 10 the pressurized air supply for the pneumatic system is connected to the system by main valve V which is normally open. From valve V a basic supply conduit element directly connects with filter F and the input side of control valve unit R4 as shown. One conduit element connected to the basic supply conduit element just upstream of filter F supplies pressurized air to the input sides of control valve units R10, R11, R12, R13, R14, each of which controls one of the venturi vacuum pump units VP, and supplies pressurized air to the input side of control valve units R15 and R16. R15 controls supply of pressurized air to cooling air jets CJ on elongated unit 250 and R16 controls supply of pressurized air to recesses SC1 and SC4 on the first elongated unit and second elongated unit respectively.

The main output connections of control valve unit R4 are connected to the input side of control valve unit R5 which controls the operation of reciprocating air motor C2 which moves the assembly carrying elongated unit 234 between its two positions. This output connection of control valve unit R4 is also connected to the input side of control valve unit R6 which controls the operation of rotary air motor RM2 which rotates the elongated unit 250 between its three positions. This same output connection is also connected with the input side of control valve unit R7 which controls the operation of reciprocating air motor C3 which operates the movable stop element 255 which cooperates with the projecting element 252 on elongated unit 250 This same output connection of control valve unit R4 is also connected with the input side of control valve unit R8 which controls operation of rotary air motor RM1 which rotates elongated unit 208 between its two rotary positions. This same output connection is also connected to the input side of control valve unit R9 which controls operation of reciprocating air motor C1 which moves the assembly carrying elongated unit 208 between its two positions. Unit R9 also controls supply of air to unit S22 which cooperates with the assembly carrying elongated unit 208 in a given position for a special purpose to be described at a later point. This same output connection of control valve unit R4 is also connected (1) with the input sides of units S3 and S4 which sense the presence of the assembly carrying unit 234 in each of its two positions, (2) with the input sides of units S5, S6, and S7 which sense the presence of unit 250 in each of its three rotary positions, (3) with the input sides of units S8 and S9 which sense the presence of unit 208 in each of its two rotary positions and (4) with the input sides of units S1 and S2 which sense the presence of the assembly carrying unit 208 in each of its two positions.

The other output connection of control valve unit R4 is connected with a normally closed pressure operated electrical switch unit PS1 which disconnects electrical power to the apparatus when air pressure is applied to it from unit R4 and maintains supply of electrical power as long as no pressure is applied from unit R4.

The supply conduit element is connected from a point between control valve unit R4 and the filter F to units B1, B6, and B6A. B6 and B6A are manually actuated valve units used as emergency stop controls which when actuated direct pressurized air from either of their output sides to the right-hand (as viewed in FIG. 10) control connection of control valve unit R4 to simultaneously terminate its output connection to control units R5, R6, R7, R8, R9 and units S1, S2, S3, S4, S5, S6, S7, S8, and S9 as described previously, and connect its other output connection to actuate or open normally closed switch PS1 which cuts off electrical power to the apparatus. Unit B1 is a manually actuated valve unit which is actuated in conjunction with adjacent manually actuated valve unit B2 to apply pressurized air to the left hand control connection of control valve unit R4 to reset it to normal operating position. The point between control valve unit R4 and filter F is also connected to the input side of control valve unit R18 which directs pressurized air either to the input side of control unit S15 when the sheeting forwarding means is moving sheeting through the apparatus which applies pressurized air at M0 or alternatively to the input sides of control units S24, S25, and S26 when the sheeting forwarding means is not moving sheeting through the apparatus which cuts off pressurized air from the upper end of unit S16 allowing it to move to its upper position and the sheeting braking means is operating which applies pressurized air at B0. If the sheeting forwarding means is moving sheeting through the apparatus, the unit 2 cannot be operated and if the sheeting forwarding means begins to operate while unit 2 is operating, unit 2 will be shut down. The main output connection of control valve unit R4 is also connected, by a branch conduit leading from a point just downstream of the lubricator L near the main output connection of unit R4, (1) to the input side of cam-actuated control valve unit V9 which directs pressurized air either to the right-hand side of control valve unit R15 to cut off pressurized airflow to cooling jets CJ, or to the left-hand side of control valve unit R15 and to the right-hand side of control valve unit R11 to respectively supply pressurized air to the cooling jets CJ and cut off flow of air to the vacuum pump VP applying subatmospheric pressure to recesses SC2 in elongated unit 250, (2) to the input side of cam-actuated control valve unit V8 which directs pressurized air either to the right-hand side of control valve unit R16 to cut off pressurized airflow to recesses SC1 and SC4 on elongated units 208 and 234 respectively, or to the left-hand side of control valve unit R16 and to the right-hand side of control valve units R10, R11, R12, R13, and R14 to respectively apply pressurized air to the recesses SC1 and SC4 on elongated units 208 and 234 and cut off pressurized airflow to the vacuum pumps VP supplying subatmospheric pressure to recesses SC1, SC2, SC3, SC4, and SC5, (3) to the input side of cam-actuated control valve unit V7 which in one of its positions directs pressurized air to the right-hand side of control valve unit R7 to cause unit R7 to direct pressurized air to one side of air motor C-3 to extend the movable stop 255 for engagement with projecting element 252 on elongated unit 250, (4) to the input side of unit S12 which, when pressurized air is applied to its left-hand end by unit S1 sensing that the assembly carrying unit 208 is in its first or upper position, applies pressurized air to the inlet side of cam-actuated valve unit V3 which directs to one side or the other of the control valve unit R8 which causes rotation of elongated unit 208 between its two rotary positions only when the assembly carrying elongated unit 208 is in its first or upper position and therefore clear of the third elongated unit 250. Unit S12, when pressurized air is applied to its left-hand end by unit S1 sensing that the assembly carrying elongated unit 208 is in its first or upper position, also applies pressurized air to the inlet side of unit S11 which, when pressurized air is applied to its left-hand end by unit S4 sensing that the assembly carrying elongated unit 234 is in its first or left position (as viewed in FIG. 2), applies pressurized air to the inlet side of cam-actuated valve V4 which directs air to one side or the other of control valve unit R6 which causes rotation of elongated unit 250 between its three rotary positions only when the assemblies carrying elongated units 208 and 234 are in their first positions and clear of elongated unit 250, (5) to the input side of control valve unit R3 which, in one of its positions (left), applies pressurized air to the left-hand sides of both control valve units R5 and R9 to cause them to operate air motors C2 and C1 to move the movable assemblies carrying elongated units 208 and 234 back tot their first positions clear of engagement with elongated unit 250 during restarting action after an emergency stop, and unit R3 while in this one position also applies pressurized air to the left-hand side of unit S13 which applies pressurized air to pressure-actuated switch PS7 which cause motor M connected to the programmer cam shaft S4 to reset or drive to its starting position at high speed. Unit R3, while in its other position (right) applies pressurized air to units RP1 and RP2 which are manually actuated valves which when held down will cause a repeat of the electrical heating cycle for the heated elements of elongated units 234 and 208 respectively, and also applies pressurized air to the inlet side of unit S10 which, when pressurized air is applied to its left-hand end by either unit S1 or S2 sensing that the assembly carrying elongated unit 208 is in either its two rotary positions, applies pressurized air either directly to the left-hand end of control valve unit R9 to cause air motor C1 to move the assembly carrying elongated unit 208 to its first or upper position clear of elongated unit 250, or to the inlet side of cam-actuated valve unit V5 which alternatively directs pressurized air to either one side or the other of control valve unit R9 to cause air motor C1 to move the assembly carrying elongated unit 208 from one of its positions to the other. In addition, unit R3 while in its other position (right) also applies pressurized air to the inlet side of cam-actuated valve unit V6 which applies pressurized air, in one of its positions, through valve unit R20 to the left side of control valve unit R5 to actuate air motor C2 in one direction to move the assembly carrying elongated unit 234 to its first position spaced clear of the third elongated unit 250 and in the other of its positions, to the right side of control valve unit R5 to actuate air motor C2 in the other direction to move the assembly carrying elongated unit 234 to its second position in cooperative engagement with the elongated unit 250. Unit R3 while in its other position (right) also applies pressurized air to the inlet side of cam-actuated valve unit V11 which in one of its positions applies pressurized air to the inlet side of unit S20. When pressurized air is applied to the upper side of unit S20 by the action of unit S22 sensing the assembly carrying elongated unit 208 in a position spaced about one inch from the elongated unit 250 (FIG. 9l) after the bonded seam shaping operation, unit S20 directs pressurized air to the upper side of air motor C1 to oppose its normal upward movement under control of control valve unit R9 for a limited period of time during which the cooling air streams from CJ, SC1 and SC4 are applied to the shaped seam after which pressurized air to unit S20 is cut off by cam actuated valve unit V11 and the assembly carrying elongated unit 208 resumes its movement to its upper position.

A sixth location to which the branch conduit leading from a point just downstream of the lubricator L near the main output connection of unit R4 is connected is the input side of cam-actuated valve unit V2, which in one of its positions applies pressurized air to the left end of control valve unit R1. A seventh location to which the branch conduit leading from a point just downstream of the lubricator L near the main output connection R4 is connected is the input side of cam-actuated valve unit V1 which in one of its positions applies pressurized air to the input side of unit S14 which in one of its positions applies pressurized air to the left side of unit R2 which applies pressurized air to unit P58 which engages the brake to render the programmer camshaft SH and programmer inoperative to the left end of control valve unit R3 and to the upper end of unit S15. As long as pressurized air is supplied to the left end of control valve unit R3 by cam-actuated valve unit V1 this unit will apply pressurized air to units S10, V6, V11, and repeat button units RP1 and RP2 as previously discussed. As long as pressurized air is supplied to the upper end of unit S15 by cam-actuated valve unit V1 control valve unit R3 cannot be moved to the left by pressure applied to its right side through unit S15. When cam-actuated valve unit V1 is in its left position cutting off pressurized air to the left of unit R3 and the upper end of unit S15, unit S15 will move to its upper position, then if (A) emergency stop buttons B6 or B6A are actuated to move valve unit R4, to its left position which cuts off all electrical power to the unit 2 and cuts off pressurized air to render basic unit 2 inoperative, and then restart buttons B1 and B2 are pushed, or (B) the drive motor for the sheeting forwarding means comes on which moves control valve unit R18 to its lower position, pressurized air would be applied from units B1, B2 or unit R18 to and through unit S15 in its lower position to the right end of unit R3 which on shifting to its left applies pressurized air directly to control valve units R9 and R5 which actuate air motors C1 and C2 respectively to immediately move the assemblies carrying elongated units 208 and 234 back to their open or first positions spaced clear of elongated unit 250.

An eighth location to which the above-mentioned branch conduit is connected is the input side of control valve unit R1 which in one of its positions applies pressurized air to the right end of control valve R2 which then in its left position applies pressurized air to unit S13 which applies pressurized air to either unit PS6 or PS7 to drive the programmer camshaft SH at either normal or fast speed. Unit R2 in this left position also applies pressurized air to the right end of control valve unit R17 which in one of its positions applies pressurized air to the right end of control valve unit R1 and to the right ends of control valve units R10 and R11 which control vacuum pumps for recesses SC1 and SC2 on elongated units 208 and 258 respectively. When control valve unit R1 is in this one position it also applies pressurized air to the upper end of unit S14 which in its lower position cuts off pressurized air to the left side of unit R2 to permit unit R2 to shift to the left as just discussed.

A ninth location to which the above-mentioned branch conduit is connected is the input side of control valve unit R2 which applies pressurized air either to the input side of S13 as mentioned previously or simultaneously to unit PS8 which actuates the brake B on camshaft SH of the unit 2 programmer to halt its operation and to pushbutton units B7 and B8 which when both actuated apply pressurized air to the left end of control valve unit R17 to preset it to starting position and also apply pressurized air to the left ends of control valve units R13 and R14 which control the vacuum pumps VP to apply subatmospheric pressure to recesses SC4 and SC5 on elongated unit 234.

Control valve unit R18 is moved to its lower position by application of pressurized air to its upper end by connection M0 when the sheeting forwarding means is energized to move sheeting through the apparatus for unwinding operations. This unit R18 is moved to its upper position by connection B0 when the sheeting forwarding means is braked and the sheeting forwarding means is not running which cuts off pressurized air at M0 and the upper ends of units R18 and S16.

Units S24 and S25 are alternative units adapted to be moved to their left by application of pressurized air to their right ends by conventional means (not shown) for sensing that a roll being unwound is approaching depletion, and conventional footage counting means (not shown) for sensing that the length of sheeting on a roll has been substantially unwound. The input sides of units S24, S25, and pushbutton operated unit S26 are supplied by pressurized air from control valve unit R18 when pressurized air from connection B0 and unit S16 is applied to its lower end. Actuation of any one of units S24, S25, or S26 applies pressurized air to the inlet side of control valve unit R17 which can apply pressurized air to the right side of unit R1 and the left side of units R10 and R11 as previously mentioned.

Pressure actuated electrical switch PS-2 actuates the electrical power unit for the heated wire and platen elements for one operating cycle when pressurized air is applied to its left side by either unit S2 sensing that the movable assembly carrying elongated unit 208 is in its second cutting position in engagement with elongated unit 250 or by unit S3 sensing that the movable assembly carrying elongated unit 234 is in its second cutting and bonding position in engagement with elongated unit 250. Units S2 and S3 also apply pressurized air under these conditions to the inlet side of solenoid-operated valve unit SOL1. Energization of the electrical power unit for the heated cutting and bonding elements for the one operating cycle also electrically energizes the solenoid-operated valve unit SOL1 to move it to the left and apply pressurized air to the left side or end of control valve unit R1 which cuts off pressurized air from the upper end of unit S14 and from the right end of unit R2 which enables unit R2 to be returned to the right to direct pressurized air to unit P38 which stops the motor M on shaft SH of the programmer. Upon completion of the one operating cycle of the electrical power unit the unit SOL1 is deenergized enabling unit SOL1 to move to the right to again direct pressurized air to the right end of unit R1 which then applies pressurized air to the upper end of unit S14 and the right end of unit R2 which causes unit R2 to apply pressurized air to unit S13 which starts motor M of the unit 2 programmer camshaft running to resume unit 2 operation. Deenergizing unit SOL1 and enabling it to move to the right also applies pressurized air to the right end of control valve unit R19 which enables it, if supplied with pressurized air from the output of cam-actuated valve unit V5, to direct pressurized air to the left end of control unit R9 to cause operation of air motor C1 to move the first movable assembly carrying elongated unit 208 to its first position clear of elongated unit 250. Deenergizing unit SOL1 and enabling it to move to the right also applies pressurized air to the lower end of control valve unit R20 which enables it, if supplied with pressurized air from the output of cam-actuated valve unit V6, to direct pressurized air to the left end of control valve unit R5 to cause operation of air motor C2 to move the second movable assembly carrying elongated unit 234 to its first position clear of elongated unit 250.

Units PS3, PS4, and PS5 are pressure operated devices cooperating with electrical power unit 275A and actuated respectively by position-sensing units S5, S6, and S7 which sense which of the three rotary positions elongated unit 250 is in, in order to select the proper electrical power magnitude and duration to accomplish the heating function carried out at that position.

Unit S17 is actuated by application of pressurized air from the output of cam-actuated valve unit V3 to vary the driving pressure applied by air motor C1 to hold the movable assembly carrying elongated unit 208 in engagement with elongated unit 250. The pressure is varied accordingly to whether elongated unit 208 is rotated for cutting action or for its bonded seam-shaping action, the pressure being greater for the latter action.

Unit S18 is moved to the left by application of pressurized air from unit S4 when unit S4 no longer senses the presence of the second movable assembly carrying elongated unit 250, and unit S18 applies pressured air supplied to it from unit S3 when unit S3 senses the presence of the second movable assembly carrying elongated unit 234 in its second position in engagement with elongated unit 250 to manually actuate toggle valve T. When toggle valve T is in the "on" position it will direct pressurized air to the inlet side of cam-actuated valve unit V10 which when actuated applies pressurized air to the left side of control valve unit R1 which will as previously described cooperate with unit R2 to stop operation of the unit 2 programmer by cutting off its camshaft drive motor and applying the camshaft brake. When the toggle valve T is in its "off" position the unit 2 programmer action is not stopped at this point. The purpose of stopping the unit 2 operation at this point enables inspection if desired to determine whether or not a suitable cutting, bonding, or shaping action has been accomplished by the respective electrically heated elements. Unit S21 performs a similar function for the first movable assembly carrying elongated unit 208 to that of unit S18 by its cooperation with units S1, S2, toggle valve T, valve unit V10 and valve unit R1. Unit S23 cuts off pressurized air from toggle valve "T" and cam-actuated valve unit V10 being applied to the left side of unit R1 upon actuation of unit 23 to its left by the actuation of pushbutton operated valves B1 and B3 to restart the unit 2 programmer cycle and camshaft SH operation after it has been stopped for the inspection.

Unit B4 is an independent pushbutton actuated valve unit for applying pressurized air to the left side of unit R2 to stop operation of unit 2 programmer camshaft motor M and energize its brake B.

This completes a description of the conduit system, operating units, and controls therefor shown in FIG. 10 and the conditions existing with the overall apparatus unwinding a first roll of sheeting L1 and forwarding it to a sheeting processing unit, the pressurized air supply and electrical power for the heated units being energized and operative.

In order to complete the discussion of the apparatus and its operation it will be assumed that with the apparatus in the condition previously described and shown in FIG. 10, and the main operating component units in position as shown in corresponding FIG. 9A, a portion of a second length of sheeting L2 is placed as shown in FIGS. 1, 2, and 9A in engagement with the elongated unit 234 carried by the second movable assembly and pushbutton actuated valves B7 and B8 are actuated. This applies pressurized air from unit R2 and units B7, and B8 to the left end of unit R17 shifting it to the right and applies pressurized air to the left ends of units R13 and R14 which actuates vacuum pumps VP to apply subatmospheric pressure to recesses SC4 and SC5 on elongated unit 234 to cause a vacuum clamping action on the portion of the second length of sheeting L2 engaged with the recesses. The next step is the sensing of substantial depletion of the 1st length of sheeting L1 on roll 1R by associated either sensing unit 8 or sheeting footage counter which automatically stops the motor driving sheeting forwarding rolls 301 and 302 and applies a brake action thereto as well as to roll 1R by means of its brake unit 6. Sheeting continues to be supplied to sheeting processing unit 401 from the accumulator unit 320.

Stopping the drive for sheeting forwarding rolls 301 and 302 causes pressurized air from connection M0 to the upper end of units R18 and S16 to be cut off, and operation of the braking means for the sheeting movement causes application of pressurized air from connection B0 through unit S16, which has moved to its upper position under action of its spring, to the lower end of unit R18, shifting it to its upper position. Sensing of substantial depletion of the first length of sheeting L1 or roll 1R also automatically applies pressure to the right end of either unit S24 or S25 shifting it to the left which applies pressurized air to the inlet side of unit R17 which had previously been shifted to the right by actuation of pushbutton actuated valves B7 and B8 previously. In its right position unit R17 applies pressurized air to the left ends of units R10 and R11 which apply pressurized air to vacuum pumps VP which apply subatmospheric pressure to recesses SC1 and SC2 on elongated units 208 and 250 respectively so that they can grip sheeting lengths which come into engagement therewith. Unit R17 also applies pressurized air to the upper end of unit S14 causing it to move downwardly to cut off pressurized air to the left end of unit R2 and also to the right side of unit R1 moving it to the left which applies pressurized air to the right end of unit R2 shifting it to the left which applies pressurized air to actuate unit PS6 to commence rotation of the programmer camshaft SH. In this position unit R2 also applies pressurized air to the right side of unit R17 which cuts off supply of pressurized air to the right side of unit R1 and cuts off pressurized air to the left side of units R10 and R11. However unit R1 remains in its left position and units R10 and 11 remain in their right positions at this time. In this position unit R2 has also cut off application of pressurized air to unit PS8 which deenergizes the brake B on programmer camshaft SH.

Cam-actuated valve unit V1 is then shifted to the left by its cooperating cam C. This cuts off application of pressurized air to the inlet side of unit S14, the left side of unit R3 and the upper side of unit S15 which however causes no other action at this time.

Next, valve unit V2 is momentarily shifted to its left and returns to its right position. This action applies pressurized air to the left side of unit R1 shifting it to the right which cuts off pressurized air to the right side of unit R2 and also cuts off supply of pressurized air to the upper end of unit S14 which moves to its upper position under action of its spring.

Then cam-actuated valve unit V5 is shifted to its left by engagement with its cam C which applies pressurized air to the left end of unit R9 which moves to the right and supplies pressurized air to air motor C1 to cause it to move the first movable assembly carrying elongated unit 208, with its electrically heated cutter wire 209 facing downwardly, from its first position toward its second position in engagement with the first length 21 of sheeting and elongated unit 250 as shown in FIG. 9B. As the first movable assembly moves elongated unit 208 from its first position, unit S1 senses its departure and moves to its lower position which applies pressurized air to the upper end of unit S21 and to the inlet side of unit S14 which being in its upper position applies pressurized air to the left side of unit R2 which in moving to the right stops operation of the motor as for programmer camshaft SH by cutting off pressurized air to unit PS6 and this movement of unit R2 also applies the brake B on camshaft SH by applying pressurized air to unit PS8.

As the first movable assembly moves elongated unit 208 into its second position, unit S2 senses its arrival there by engagement with the assembly and is shifted to its lower position in which it applies pressurized air to unit PS2 which initiates operation of the electrical power supply unit for heating the cutter wire element 209 and causes a signal from the electrical unit to move unit SOL1 to its left position. Unit 52 also applies pressurized air to the inlet side of unit SOL1 which being in its left position applies pressurized air to the left end of unit R1 which maintains the programmer camshaft motor M stopped via the action of cooperating units S14 and R2. As the first elongated unit 208 is moved from its first upper position to its second position in engagement with the first length of sheeting L1 and elongated unit 250, the sheeting is engaged by recesses SC1 and SC2 which had previously been actuated by units R10 and R11 to carry out their vacuum clamping or gripping action on the engaged sheeting.

At the end of the electrical heating and cutting cycle, which is timed by the electrical power supply unit and during which length of sheeting L1 is severed as shown in FIG. 9B, the electrical signal from the electrical unit terminates at unit SOL1 to enable unit SOL1 to move to its right under spring action and apply pressurized air to the right side of unit R1 and to the lower end of unit R20 while cutting off pressurized air to the left side of unit R1. Applying pressurized air to the right side of unit R1 while cutting off pressurized air to its left side once again moves it to its left position and applies pressurized air to the right side of unit R2 and the upper side of unit S14 to move unit R2 to its left position and allow unit S14 to move to its upper position to restart operation of the programmer camshaft motor M after releasing its brake. Applying pressurized air to the lower end of unit R20 moves it to its upper position. As the programmer camshaft resumes rotation cam-actuated valve unit V5 is moved to the right by its cam C and applies pressurized air to the left end of unit R9 which moves to the right and applies pressurized air to air motor C1 to cause it to move the first movable assembly carrying elongated unit 208 back toward its first position spaced clear of elongated unit 250. As elongated unit 208 is moved back to its first position its recesses SC1 in gripping engagement with one severed portion of length of sheeting L1 carry this severed portion upwardly with unit 208 and out of the way of subsequent operations. The other severed portion of length of sheeting L1 is gripped by recesses SC2 on elongated unit 250. As the first movable assembly reaches the first position unit S1 is actuated to its upper position in which it applies pressurized air to the left end of unit S12 which then applies pressurized air to the inlet side of cam-actuated valve unit V3. Following this, valve unit V3 is moved to the right by its cam C in which position it applies pressurized air to the lower end of unit R8 which moves upwardly to apply pressurized air to rotary air motor RM1 to cause it to rotate elongated unit 208 through 180° to position the electrically heated platen element 210 in position facing downwardly and carry the one severed portion of length of sheeting L1 which is gripped by recesses SC1 out of the way all shown in FIG. 9C. Unit V3 in its right position also applies pressurized air to the right end of unit S17 to permit higher pressure air regulator unit RG2 to be connected for supply to air motor C1 to provide greater force required when using the heated platen element as compared with the force required for heated wire element 209. While rotary air motor RM1 is rotating elongated unit 208 between its two positions, a projection 295 on element 296 which is rigidly attached to elongated unit 208 for rotation therewith, moves from a position of engagement with rotary position sensing unit S8 to a position of engagement with rotary position sensing unit S9. When elongated unit 208 and projection 295 are in either of the two rotary positions one of the units S8 or S9 will apply pressurized air to the left end of unit S10 which can then apply pressurized air to the inlet side of cam-actuated valve unit V5 which controls the up and down movement of the first movable assembly carrying rotatable elongated unit 208. This means that the movable assembly carrying rotatable elongated unit 208 can only be moved between its first and second positions when the rotatable elongated unit 208 is in one of its two rotary positions. When unit 208 is not in one of these rotary positions, units S8 and S9 cut off pressurized air to the left side of unit S10 which prevents supply of pressurized air to valve unit V5 which controls up and down movement of the first movable assembly carrying elongated unit 208.

In the next step in the sequence of operations, cam-actuated valve unit V4 is moved to the left by its cam C in which position it applies air to the upper end of unit R6 to move it downwardly in which position it applies pressurized air to rotary air motor RM2 to rotate elongated unit 250 about 180° from the "cut" position to the "bond" position carrying with it the severed portion of sheeting length L1 which is gripped by recesses SC2 as shown in FIG. 9D. Since cam-actuated valve unit V7 is being maintained in its right position applying pressurized air to the right side of unit R7, this applies pressurized air to air motor C3 in order to keep retractable stop element 255 retracted and out of the way of the projecting element 252 on elongated unit 250 during its 180° rotation. While rotary air motor RM2 is rotating elongated unit 250 from the "cut" to the "bond" position, a projection 395 on element 396 which is rigidly attached to elongated unit 250 for rotation therewith, moves from a position of engagement with rotary position sensing unit S5 to a position of engagement with rotary position sensing unit S7.

When unit S5 senses elongated unit 250 is in its rotary "cut" position it applies pressurized air to unit P33 which selects the proper electrical power setting of the electrical power supply unit 275A to be used in supplying power to cutting element 209. In a similar matter the power setting is selected by units S6 and S7 for each of the seam shaping and the trimming bonding steps carried out at the other two positions of elongated unit 250. When unit S7 senses unit 250 in its "bond" position, it also applies pressurized air to the left end of unit R7 to cause it to apply pressurized air to motor C3 to extend retractable stop element 255 on elongated unit 250 for use in limiting the next rotation to the "shape" position.

At this point it should be noted that due to the action of unit S11 which is moved to the right by the action of unit S4 sensing the second movable assembly carrying elongated unit 234 in its first position spaced from unit 250, and due to the action of unit S12 which is moved to the right by the action of unit S1 sensing the first movable assembly carrying elongated unit 208 in its first position spaced from elongated unit 250, which actions control the supply of pressurized air to cam-actuated valve unit V4 which in turn controls rotation of elongated unit 250 by rotary air motor RM2, elongated unit 250 cannot be rotated unless units 208 and 234 are safely spaced from it in their first positions.

In the next step, valve unit V6 is moved to its left by its cam C to apply pressurized air to the right end of unit R5 which moves it to its left positions where it applies pressurized air to air motor C2 to move the second movable assembly carrying elongated unit 234, and the length of sheeting L2 gripped thereby at recesses SC4 and SC5, from its first position to its second position in engagement with elongated unit 250 and the length of sheeting gripped thereby by recesses SC2 as shown in FIG. 9E. As the second movable assembly carrying elongated unit 234 leaves its first position and terminates its engagement with position sensing unit S4, unit S4 moves to the right applying pressurized air to the right end of unit S18 shifting it to the left and also applying pressurized air to the input side of unit S14. Unit S14, being in its upper position applies pressurized air to the left end of unit R2 moving it to the right which cuts off pressurized air to unit PS6 cutting off programmer camshaft motion and applies pressurized air to unit PS7 to apply brake B on the programmer camshaft. As the second movable assembly reaches its second position and engages position sensing unit S3, unit S3 is moved to the right in which position it applies pressurized air first to unit PS2 which initiates operation of the electrical power supply unit for heating the trimming and bonding wire element 235 and causes a signal from the electrical unit to move unit SOL1 to its left position, and secondly to the inlet side of unit SOL1 which being in its left position applies pressurized air to the left end of unit R1 which maintains the programmer camshaft motor M stopped in cooperation with the action of units S14 and R2. At the end of the electrical heating cycle for the trimming and bonding operation during which the end portions of the engaged lengths of sheeting are trimmed and their adjacent edges bonded together as shown in FIG. 9F, the electrical signal holding unit SOL1 in its left position terminates. This enables unit SOL1 to move to the right under its spring action and supply pressurized air to the right side of unit R1 and to the lower end of unit R20 while cutting off pressurized air to the left side of unit R1. Applying pressurized air to the right side of unit R1 once again moves it to its left position and applies air to the right side of unit R2 and the upper side of unit S14 to move unit R2 to its left positions and allow unit S14 to move to its upper position to restart operation of the motor M on programmer shaft SH after releasing its brake B. As the programmer camshaft resumes rotation, cam-actuated valve unit V6 is moved to its right position in which it applies pressurized air to the left end of unit R5 causing it to apply pressurized air to air motor C2 to cause it to move the second movable assembly carrying elongated unit 234 back to its first position spaced from elongated unit 250 carrying with it the trimmed waste end portions of the lengths of sheeting. As the second movable assembly carrying elongated unit 234 moves out of its second position in engagement with elongated unit 250, position sensing unit S3 is moved to its left position which applies pressurized air to the inlet side of unit S18. As the second movable assembly moves back into its first position it engages position sensing unit S4 and moves it to its left position in which it applies pressurized air to the left side of unit S11 which, as described previously, enables cam-actuated valve unit V4 to operate the rotary air motor RM2 for rotating elongated unit 250 by supplying pressurized air to the inlet side of unit V4.

In the next step cam-actuated valve V9 is moved by its cam C to its left position for a short period and then back to the right position which action first applies pressurized air to the right side of unit R11 to cut off pressurized air to the vacuum pump VP applying subatmospheric pressure to recesses SC2 in elongated unit 250, and secondly applies pressurized air first to the left end of the unit R15 moving it to the right in which position it applies pressurized air to operate cooling jets CJ in elongated unit 250 and then to the right end of unit R15 moving it back to the left where it cuts off pressurized air and operation of jets CJ which have cooled the bonded joints between the joined end portions of the lengths of sheeting. This would occur between the steps shown in FIGS. 9F and 9G.

In the next step, cam-actuated valve unit V4 is moved by its cam C to its right position in which it applies pressurized air to to the lower end of unit RG which moves it up to direct pressurized air to cause rotary air motor RM2 to rotate elongated unit 250 back toward its first position. However it is prevented from doing so by engagement of the projecting element 252 on unit 250 with the retractable stop element 255 which as mentioned previously had been moved to its extended position at this point by its air motor C3. Movement to this position is indicated in FIG. 9G and has the effect of applying a degree of tension across the bonded joint of the joined lengths of sheeting and moving the joint to the right in a position under the platen member 210 on elongated unit 208. When elongated unit 250 has been rotated to this third position determined by retractable stop 255 projecting element 395 which rotates with unit 250 engages position sensing unit S6 which is moved to its right position in which it applies pressurized air to unit PS4 which signals the electrical power supply unit to select the proper electrical power setting to be used in supplying power to the platen element 210.

In the next step, cam-actuated valve unit V5 is shifted to its left by its cam C in which position it operates as previously described to move the first movable assembly carrying elongated unit 208, this time with its electrically heated platen member 210 facing downwardly from its first position to its second positions in engagement with the bonded joint and elongated unit 250 where the heated platen member applying pressure to the bonded joint shapes it to a uniform thickness equal to the thickness of the sheeting. This step is shown in FIG. 9H. During this step, cam-actuated valve unit V11 is shifted to its right by its cam C which applies pressurized air to the inlet side of unit S20. At the end of this joint shaping operation, cam-operated valve unit V5 again is shifted to the right to again shift unit R9 to cause the air motor C1 to move the first movable assembly carrying elongated unit 208 back to its first position. This time as air motor C1 moves the first movable assembly upwardly, at a position spaced a short distance above its second position the first movable assembly engages unit S22 which is moved to the right in which position it applies pressurized air to the upper ends of units S19 and S20 moving each to their lower positions. Unit S19 in its lower position blocks the exhaust air from the upper end of air motor C1 and unit S10 applies the pressurized air supplied to it by unit V11 to the upper end of motor C1 which opposes pressurized air supplied to its lower end by its control valve unit R9. This causes the first movable assembly carrying elongated unit 208 to remain in this position spaced a short distance above elongated unit 250 as shown in FIG. 9I for a short period of time until cam-actuated valve unit V11 cuts off pressurized air to unit 10 which then permits the first movable assembly to resume its upward movement back to its first positions. For another interval of time which includes the short period of time during which upward movement of elongated unit 208 is interrupted, cam-actuated valve unit V9 is moved by its cam C to its left position in which it applies pressurized air to both the left end of unit R15 which applies pressurized air to operate cooling jets CJ. Cam-actuated valve unit V8 is also moved to its left position during this interval to apply pressurized air to the right ends of units R10, R12, R13, and R14 to cause them to cut off pressurized air to the vacuum pumps VP applying subatmospheric pressure to recesses SC1, SC3, SC4, and SC5 to terminate their vacuum clamping or gripping action. Unit V8 in its left position also applies pressurized air to the left end of unit R16 causing it to apply pressurized air to recesses SC1 and SC4 to provide additional cooling airstreams. At the end of this interval, units V8 and V9 are shifted by their cams C to cut off pressurized air producing the cooling jets and streams.

In the next step cam-actuated valve unit V4 is momentarily shifted by its cam C to its left position which as previously described will apply pressurized air to cause rotary air motor RM2 to momentarily rotate from its first or "cut" position toward its "second" or "bond" position long enough for cam-actuated valve unit V7 to be shifted to its right position in which it applies pressurized air to the right end of unit R7 which then directs pressurized air to air motor C3 to cause it to retract the retractable stop element 255. As soon as stop element is withdrawn valve unit V4 returns to its right position in which it causes rotary air motor RM2 to return elongated unit 250 back to its starting position as shown in FIG. 9J and FIG. 3.

In the next step cam-actuated valve unit V3 is shifted by its cam to cause rotary air motor RM1 to rotate elongated unit 208 to place its cutting element 209 in its downwardly facing sheeting cutting position as shown in FIGS. 2 and 9A.

The final step in the operating sequence of unit 2 is the movement of cam-actuated valve unit V1 by its cam C to its right position in which it applies pressurized air to the inlet side of unit S14 which is in its upper position and applies pressurized air to the left end of unit R2 which as previously described shifts pressurized air from unit PS6 to unit PS8 to cut off the programmer camshaft motor M and apply its brake B. When the unit 2 operation is complete, the unwinding operation is automatically restarted by releasing the braking devices at the unwind unit and at the sheeting forwarding rolls, and starting the power drive to the sheeting forwarding rolls. The unwind unit is also actuated to rotate roll 2R to the position formerly occupied by roll 1R. The apparatus is then ready for the next cycle of operation.

It is believed that the construction and operation of the overall apparatus combination and of the unit 2 are clear from the preceding description, and that it is clear that an improved apparatus and process arrangement has been provided in accordance with the objects of the invention.

In accordance with the patent statute a detailed description of a preferred embodiment has been provided. However, many variations and modifications within the spirit of the invention will appear to those skilled in the art and such are considered to fall within the scope of the following claims.

What is claimed is:

1. An apparatus for receiving a plurality of rolls of sheeting of uniform thickness, automatically joining said rolls in series to form a continuous sheeting of uniform thickness, and supplying the continuous sheeting along a general path of movement to a sheeting processing unit, said apparatus comprising in combination a first unit for receiving and supporting a plurality of rolls of sheeting for sequential unwinding thereof, a second unit cooperating with said first unit and including sheeting, guiding and supporting means for maintaining and guiding a first sheeting of given uniform thickness being unwound from one of such rolls supported by said first unit along said general path of movement, said second unit also constructed and arranged to receive and hold in a first position a portion of a second sheeting of uniform thickness equal to that of said first sheeting from another of such rolls supported by said first unit, said second unit further constructed and arranged to engage said first sheeting being unwound and guided by said second unit and said second sheeting being held at said first position to sever said first sheeting on a roll being unwound and join the portion thereof being guided by the second unit to the portion of said second sheeting being held by the second unit, said second unit further comprising a first holding means for engaging said portion of said second sheeting to maintain said portion in said first position adjacent said general path of movement and extending along at least a portion of said general path, said second unit further comprising a severing means for severing a length of said first sheeting being guided by said sheeting guiding and supporting means and a second selectively movable holding means adjacent said general path of movement and spaced from said severing means for engaging a severed portion of this sheeting which extends from said severing means toward said sheeting processing unit and operative to move such severed portion of sheeting to a trimming and bonding position, said first holding means being selectively movable between said first position and the trimming and bonding position to move said portion of said second sheeting into engagement with the severed portion of said first sheeting being maintained at the trimming and bonding position by said second holding means, said second unit further comprising a sheeting trimming and bonding means cooperating with said first and second holding means and the portions of first and second sheeting held thereby at the trimming and bonding position to trim these sheetings to form two adjacent opposing corresponding edge portions, one extending transversely across each said sheeting and bonding such edge portions together, tensioning means cooperating with one of said holding means and constructed and arranged to apply a degree of tension across said bonded edge portions of the joined lengths of sheeting, said second unit further comprising a bonded edge shaping means cooperating with said first bonding means to engage the bonded edges of the joined lengths of sheeting to produce a uniform thickness at the bonded edges equal to that of the joined lengths of sheeting, said apparatus further comprising a sheeting processing unit cooperating with said second unit and positioned along said general path of movement, said processing unit cooperating with sheeting forwarding means for operative engagement with sheeting supplied to said processing unit, said apparatus further comprising a control means cooperating with said first unit, said second unit, and said sheeting forwarding means to suspend operation of said first unit and said sheeting forwarding means to stop movement of sheeting being unwound, guided through said second unit, and being moved to the sheeting forwarding means in response to a predetermined amount of sheeting having been unwound from on a roll of sheeting being unwound at said first unit, said control means further cooperating with said first unit, second unit and sheet forwarding means to initiate action of said second unit to sever the first sheeting on a roll being unwound and join the portion thereof being guided by the second unit to a portion of said second sheeting from another roll and held at the given position and then initiating action of the first unit and the sheeting forwarding means to resume movement of sheeting from said first unit through the second unit to the sheet forwarding means, said second unit further comprising a programmer means cooperating with said control means of said apparatus and operatively connected with said holding means, said severing means, said trimming and bonding means, said tensioning means, and said bonded edge forming means to automatically operate the same in a predetermined manner.

2. The apparatus of claim 1 which is adapted to handle sheeting of thermoplastic polymeric material and in which said severing means and said trimming means comprise electrically heated wire units for severing and trimming the lengths of sheeting and for bonding the opposed edges thereof together, and said bonded edge shaping means comprises an electrically heated platen element for operative engagement with the bonded edge portions, said programmer means further operatively connected with said heated wire units and said platen element for operating the same in coordinated manner with said other means.

3. The apparatus of claim 2 in which said second unit further comprises fluid pressure cooling devices for cooling the bonded and formed edges, the first holding means, second holding means, and severing means of said second unit each comprising (1) a fluid pressure device for gripping sheeting brought into engagement therewith, and (2) a fluid pressure positioning drive motor device, said programmer means comprising a fluid pressure logic system cooperating with said first unit, said sheeting forwarding means and sheeting processing unit and further operatively connected to a pressurized fluid supply conduit and said fluid pressure devices to operate the devices in desired time relationship.

4. An apparatus unit to cut and weld lengths of thermoplastic polymeric sheeting, said apparatus comprising in combination, supporting frame structure, first means supported on said structure for maintaining a first sheeting in a position extending along a general path relative to said unit, second means supported on said structure for engaging a second sheeting to maintain said second sheeting in a first position adjacent said path, third means supported on said structure adjacent said path for severing said first sheeting extending along said path, fourth means supported on said structure in cooperation with said third means for engaging one severed portion of said first sheeting extending along said path and transferring the severed portion to a trimming and bonding position, said second means being mounted on said frame structure for selective movement between said first position and the trimming and bonding position to move said second sheeting into operative engagement with said severed portion of said first sheeting being maintained at the trimming and bonding position by said fourth means, said unit further comprising fifth means supported by said structure and cooperating with said second and fourth means for trimming the first and second sheeting in operative engagement with one another to form two adjacent opposing corresponding edge portions, one extending transversely across each of the lengths of the sheeting, and bonding such edge portions together, one of said second and fourth means being mounted for movement relative to the other to apply a certain degree of tension across the bonded edge portions of the joined lengths of sheeting, said unit further comprising a sixth means carried by said structure and cooperating with said one of said second and fourth means to engage the bonded edges of the joined lengths of sheeting to produce a uniform thickness along the bonded edges, said unit further comprising a seventh means operatively connected with and cooperating with said second, third, fourth, fifth, and sixth means for automatically operating the same in the desired predetermined time relationship.

5. The apparatus unit of claim 4 in which said second and fifth means each comprise a movable member mounted on the supporting frame structure adjacent one side of said general path, extending transversely thereof, said movable members operatively connected with a first drive mechanism for (1) selectively moving said second means between said first position and said trimming and bonding position, and also for (2) selectively moving said fifth means between an inoperative position and said trimming and bonding position, said third and sixth means each comprising a movable member mounted on the frame structure adjacent the other side of said general path, extending transversely thereof, said members operatively connected with a second drive mechanism for (1) selectively moving said third means between an inoperative position and operative engagement with a length of sheeting extending along said path, for (2) moving such engaged sheeting into operative engagement with said fourth means, and for (3) selectively moving said sixth means between an inoperative position and operative engagement with tensioned bonded edge portions of the joined lengths of sheeting for producing the uniform thickness along such edge portions, said fourth means comprising a third movable assembly mounted on the frame structure adjacent the other side of said general path and extending transversely thereof, said third movable assembly operatively connected with a third drive mechanism for selectively moving said fourth means between (1) a first position and (2) said trimming and bonding position and (3) a third position spaced from the trimming and bonding position to tension the bonded edges of joined lengths of sheeting engaged by said fourth means, said first, second, and third drive mechanisms operatively connected with said seventh means for automatic operation in desired time relationship.

6. The apparatus unit of claim 5 in which said third means and said fifth means each comprises an electrically heated wire device for respectively severing sheeting, and trimming lengths of sheeting and bonding opposed edge portions of lengths of sheeting, and said sixth means comprises an electrically heated platen member for subjecting the tensioned bonded edges of the joined length of sheeting to predetermined conditions of pressure and temperature.

7. The apparatus unit of claim 6 in which said second, third, and fourth means each comprised a fluid pressure device for gripping sheeting brought into engagement therewith, said first, second, and third drive means each further comprises a fluid pressure motor device, said fourth means comprises a fluid pressure device for directing a fluid stream to cool the bonded edge portions of the joined lengths of sheeting, said apparatus unit further comprising a pressurized fluid supply connection, said seventh means comprises a fluid pressure logic system operatively connected to said fluid pressure devices and said supply connection to operate the same in desired time relation.

8. The apparatus unit of claim 7 in which the fluid pressure devices of said second and third means each comprises structure defining at least one recess connected, constructed and arranged in cooperation with said seventh means to selectively apply suction forces to engaged sheeting to deform and grip the same by frictional snubbing action against the edges of the recess and alternatively apply pressurized streams of air to cool bonded portions of sheeting under control of said fluid pressure logic system.

9. The apparatus unit of claim 8 which further comprises electric power supply connections cooperating with said seventh means for heating said heated wire devices and the heated platen member when in operative association with sheeting, and in predetermined position for severing, trimming, bonding, and forming the sheeting material during the desired operation of the unit.

10. The apparatus unit of claim 4 in which said second means and said fourth means are constructed and arranged for movement relative to each other and cooperating with said engaged lengths of sheeting such that after movement of such one severed portion of such one length of sheeting by said fourth means to said trimming and bonding position, and after movement of another length of sheeting by said second means from said first position to said trimming and bonding position, such one length of sheeting is maintained in a configuration having a first major portion extending along in one direction said general path and a second lesser terminal portion deflected transversely from said general path and extending at a substantial angle thereto on one side of said path, and such another length of sheeting is placed in a configuration having a first major portion extending in the opposite direction along said general path and a second lesser terminal portion deflected transversely from said general path and extending at a substantial angle thereto on the same one side of said path, and a transversely extending portion of the corresponding opposed major surfaces of said lesser terminal portions being maintained in engagement with each other and extending the same direction transverse to said general path, by said second and fourth means, said trimming and bonding element constructed and arranged to cooperate with the opposed engaged lesser terminal portions at the trimming and bonding position to simultaneously trim off the ends of the transversely extending side by side lesser terminal portions to create equal remaining lengths having two adjacent corresponding edge portions and bond the edge portions together to join the two edge portions of the lengths of sheeting.

11. An improved apparatus for cutting and butt-welding lengths of thermoplastic sheeting said apparatus comprising in combination, supporting frame structure having an inlet end portion for receiving lengths of sheeting and an outlet end portion for removal of lengths of sheeting, a plurality of guide roller elements carried by said frame structure and defining a general path for movement of lengths of sheeting between the inlet end portion and the outlet end portion, a first elongated unit rotatably mounted for movement about a longitudinal axis on a first movable assembly carried by said supporting frame structure on one side of said path, said elongated unit extending transversely across the general path of movement of sheeting through said apparatus, a first actuating means cooperating with said frame structure and said movable assembly for moving said first movable assembly between a first position in which said first elongated unit is spaced away from said path and a second position in which said elongated unit is in operative engagement with a first stationary length of sheeting in said path, said first elongated unit comprising a longitudinally extending first portion provided with an electrically heated elongated wire element extending transversely of said path and a longitudinally extending second portion provided with an electrically heated platen element extending tranversely across said path, a first rotary drive means cooperating with said first movable assembly and said first elongated unit for selectively rotating the unit between a first rotary position in which, when said first movable assembly is in its second position said wire element is positioned for operative cutting engagement with a first length of sheeting in said path, and a second rotary position in which, when said first movable assembly is in its second position, said platen element is positioned for operative shaping engagement with a welded seam joining two lengths of sheeting in said path said longitudinally extending first portion of said first elongated unit provided with structure defining a plurality of spaced recesses adjacent said wire element, said apparatus further comprising a gas system operatively connected to said recesses for selectively applying to said recesses a subatmospheric pressure to provide a vacuum clamping action on sheeting engaged by said recesses and applying a pressure significantly above atmospheric to provide cooling jets of gas adjacent said second position, said apparatus further comprising a second elongated unit mounted on a second movable assembly carried by said frame structure on the other side of said path, said second elongated unit extending transversely across the general path at a general location between the first elongated unit and the inlet end of the apparatus, a second actuating means cooperating with said frame structure and said second movable assembly for moving said second movable assembly and said second elongated unit between a first position where it is operative to engage a second stationary length of sheeting in said path and a second position adjacent said path, said second elongated unit comprising a longitudinally extending portion provided with an electrically heated elongated wire member extending transversely of said path, said longitudinally extending portion of said second elongated unit further comprising structure defining a plurality of spaced recesses adjacent said wire member said recesses operatively connected to a gas system for selectively applying to said recesses a subatmospheric pressure to provide a vacuum clamping action on sheeting engaged by said recesses and applying a pressure significantly above atmospheric pressure to provide cooling jets of gas adjacent said second position of said second elongated unit, said apparatus further comprising a third elongated unit rotatably mounted on said frame structure on said other side of said path and positioned along said path a given distance from said second elongated unit, said third unit extending transversely across the said general path, a second rotary drive means cooperating with said frame structure and said third elongated unit for selectively rotating said third elongated unit to each of three positions, said third elongated unit comprising a first elongated portion constructed and arranged when in one of said three positions to be aligned with and cooperate with said wire element of said first elongated unit when said first movable assembly is in its second position, and concurrently said first elongated unit is in its first rotary position, said first elongated portion of said third elongated unit provided with structure defining a plurality of spaced recesses operatively connected to said gas system for application to said recesses of a subatmospheric pressure to provide a vacuum clamping action on sheeting engaged by said recesses, said third elongated unit further comprising a second elongated portion constructed and arranged when in another of said three positions, to be aligned with and cooperate with said wire member of said second elongated unit when said second elongated unit is in its second position, said second elongated portion further constructed and arranged, when in the remaining position of said three positions, to be aligned with and cooperate with said platen element of said first elongated unit when said first movable assembly is in its second position and concurrently said first elongated unit is in its second rotary position, said second elongated portion of said third elongated unit comprising structure defining a plurality of spaced recesses operatively connected to said gas system for selectively providing a vacuum clamping action on sheeting engaged by said second elongated portion and providing cooling jets of gas adjacent said third elongated unit when said third elongated unit is in said remaining position of said three, said apparatus further comprising electrical power supply connections operatively connected to said wire element said platen element, and said wire member to enable heating of the same to operative sheeting cutting temperatures, and a control unit operatively connected and cooperating with each of said actuating means, each of said drive means, said electrical power supply connections and said gas system to cause the apparatus to operate through its cycle which comprises applying subatmospheric pressure to said recesses on said second elongated unit to provide a vacuum clamping action on a second length of sheeting placed in engagement with said elongated unit and its wire member at its first position, initiating action of said first actuating means to move said first elongated unit in its first rotary position to its said second position in engagement with a first length of sheeting in said general path and into engagement with said first elongated portion of said third elongated unit in its said one position, connecting said wire element of said first elongated unit to said power supply connections to enable the wire element to sever said first length of sheeting and applying subatmospheric pressure to said recesses on said first elongated portion of said third elongated unit to provide a vacuum clamping action on a severed length of said first length of sheeting extending between said wire element toward the outlet end portion of said frame structure, initiating action of said first actuating means to move said first movable assembly back to its first position, initiating action of said second rotary drive means to rotate said third elongated unit to move second elongated portion thereof into engagement with the clamped severed end of said first length of sheeting at said other of the third elongated units three positions, initiating action of said second actuating means to move the second elongated unit carrying the clamped second length of sheeting into said second position of said second elongated unit in engagement with the severed portion of the first length of sheeting clamped to the second elongated portion of said third elongated unit in its said other of three positions, connecting the wire member to said power supply connection to enable the wire member to trim and bond the ends of the engaged lengths of sheeting, initiating action of said second actuating means to move the second elongated unit back to its first position while applying gas above atmospheric pressure to said recesses on said second elongated unit to provide gas jets to cool the bonded ends of the sheeting, initiating action of said second rotary drive means to move said third elongated unit carrying the bonded ends to the said remaining position of the three positions, initiating action of said first rotary drive means to rotate said first elongated unit to its second position initiate action of said first actuating means to move the first elongated unit and platen element to the second position in engagement with the bonded ends of sheeting clamped on said third elongated unit, connecting the platen element to said power supply connections to heat shape the bonded ends of sheeting to uniform thickness equal to that of the sheeting, initiating action of said first actuating means to move said first elongated unit back toward its first position and applying gas above atmospheric pressure to said recesses in the second elongated portion of said third elongated member to provide gas jets to cool the shaped bonded ends of sheeting.

* * * * *